United States Patent
Cohen et al.

(10) Patent No.: US 8,122,447 B2
(45) Date of Patent: Feb. 21, 2012

(54) FIRMWARE INSTALLATION

(75) Inventors: Eugene Cohen, Eagle, ID (US); Brian Hoffmann, Boise, ID (US); Chris Lee, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1176 days.

(21) Appl. No.: 11/831,559

(22) Filed: Jul. 31, 2007

(65) Prior Publication Data
US 2009/0037904 A1 Feb. 5, 2009

(51) Int. Cl.
*G06F 9/445* (2006.01)
(52) U.S. Cl. .......................... 717/175; 717/169; 717/170
(58) Field of Classification Search .................... None
See application file for complete search history.

(56) References Cited

U.S. PATENT DOCUMENTS

| | | | |
|---|---|---|---|
| 6,289,511 B1 | 9/2001 | Hubinette | |
| 6,301,710 B1 * | 10/2001 | Fujiwara | 717/175 |
| 6,681,392 B1 * | 1/2004 | Henry et al. | 717/176 |
| 6,971,095 B2 * | 11/2005 | Hirai et al. | 717/173 |
| 7,013,461 B2 * | 3/2006 | Hellerstein et al. | 717/177 |
| 7,082,549 B2 | 7/2006 | Rao et al. | |
| 7,146,609 B2 * | 12/2006 | Thurston et al. | 717/169 |
| 7,155,462 B1 * | 12/2006 | Singh et al. | 717/170 |
| 7,158,248 B2 | 1/2007 | Smith et al. | |
| 2003/0177485 A1 * | 9/2003 | Waldin et al. | 717/169 |
| 2003/0212856 A1 * | 11/2003 | Nichols | 711/114 |
| 2004/0194081 A1 | 9/2004 | Qumei et al. | |
| 2004/0226008 A1 * | 11/2004 | Jacobi et al. | 717/168 |
| 2004/0243991 A1 | 12/2004 | Gustafson et al. | |
| 2005/0102665 A1 | 5/2005 | Barta et al. | |
| 2006/0020937 A1 * | 1/2006 | Schaefer | 717/175 |
| 2006/0095708 A1 * | 5/2006 | Sater et al. | 711/172 |
| 2006/0130039 A1 * | 6/2006 | Yuuki | 717/168 |
| 2007/0028226 A1 | 2/2007 | Chen et al. | |
| 2008/0028385 A1 * | 1/2008 | Brown et al. | 717/170 |

OTHER PUBLICATIONS

Jann et al, Dynamic Reconfiguration: Basic Building Blocks for Autonomic Computing on IBM pSeries Servers, 2003, IBM Systems Journal pp. 29-37, Retrieved on [Dec. 29, 2011] Retrieved from the Internet: URL<http://ieeexplore.ieee.org/stamp/stamp.jsp?tp=&arnumber=5386837>.*

Mitchell et al, IBM Power5 Processor-based servers: A Highly Available Design for Business-Critical Applictions, 2005, pp. 1-44, Retrieved on [Dec. 29, 2011] Retrieved from the Internet: URL<https://www-07.ibm.com/systems/includes/pdf/power5_ras.pdf>.*

* cited by examiner

*Primary Examiner* — Thuy Dao
*Assistant Examiner* — Cheneca Smith
(74) *Attorney, Agent, or Firm* — Chun-Liang Kuo

(57) ABSTRACT

A firmware bundle is download to a non-operational storage area without changing a live copy of firmware in a device. The firmware bundle is downloaded in order to reboot the device to deploy one or more downloaded firmware packages from the non-operational storage area to the device, launch an Early Boot Installer manager to spawn and monitor the status of one or more Early Boot Installer processes contained in the firmware bundle download, determine in parallel whether a firmware install to one or more subsystems of the device is desire, and install the downloaded firmware package in parallel to one or more subsystems of the device.

19 Claims, 5 Drawing Sheets

FIRMWARE INSTALLATION

BACKGROUND

As devices have become more complex, the number of devices composed of multiple subsystems has increased. Subsystems within such devices often incorporate firmware to operate correctly and efficiently. In addition, subsystems within such devices sometimes incorporate periodic firmware installation updates in order to add functionality and to remove bugs.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

Figure 1:
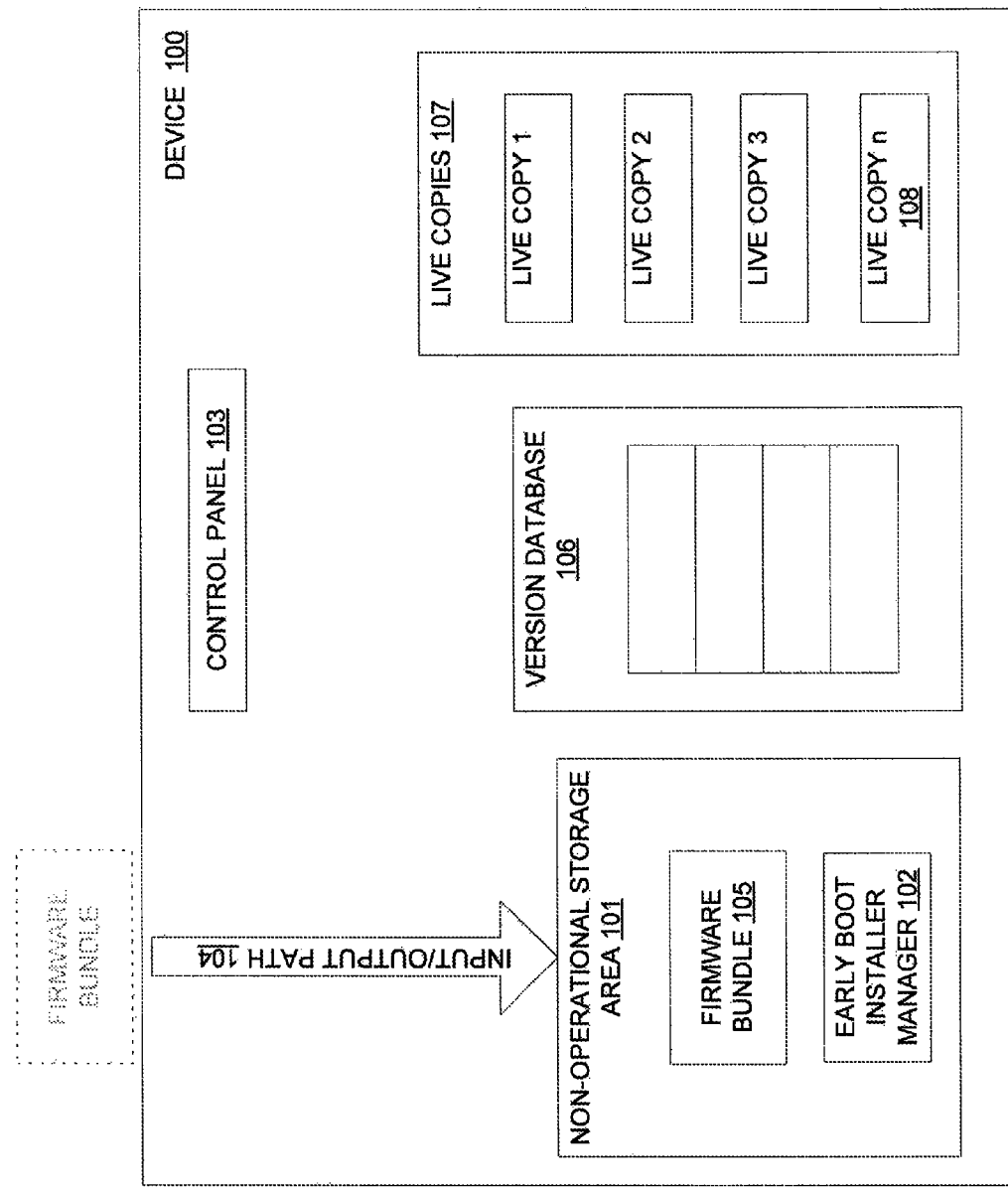
FIG. 1 is a diagram of a device within which the downloading and installing of a firmware package can be performed, according to an embodiment of the invention.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention FIG. 1 illustrates a device 100 in which embodiments of the present disclosure may be implemented. The device 100 includes a downloaded firmware bundle 105, a non-operational storage area 101, an Early Boot Installer manager 102, an input/output path 104, a control panel 103, a version database 106, and a live copy of firmware 107 for each subsystem within the device 100, such as live copy n 108. As can be appreciated by those of ordinary skill within the art, the device 100 may include other additional subsystems or components, in addition to and/or in lieu of those depicted in FIG. 1.

FIG. 1 illustrates a downloaded firmware bundle 105 stored in the non-operational storage area 101. In one embodiment, the downloaded firmware bundle 105 may have been downloaded to the non-operational storage 101 area utilizing an input/output path 104 in the device 100. In addition, the device 100 possesses a live copy of firmware 107 for each corresponding subsystem on the device 100 (e., live copy n 108) and a version database 106 to keep track of the version of each live copy of firmware 107 on the device 100. As can be appreciated by those of ordinary skill within the art, the device 100 may include other subsystems and components, in addition to and/or in lieu of those depicted in FIG. 1.

The control panel 103 provides a means for a user to communicate with the device 100. The control panel 103 is a component or device that may be either internally or externally attached to the device 100 and may serve as a communication tool for the device 100 and the user. In one embodiment, the control panel 103 may be used as a user interface to initiate a download. In another embodiment, the control panel 103 may be utilized by the device 100 to provide status reports to the user. As can be appreciated by those of ordinary skill within the art, the control panel 103 may be utilized for other purposes, in addition to and/or in lieu of those depicted in the embodiment.

As noted above, the downloaded firmware bundle 105 may be downloaded through any input/output path 104 and may be stored in the non-operational storage area 101. In one embodiment, the downloaded firmware bundle 105 stored in the non-operational storage area 101 may include one or more firmware packages. A firmware bundle 105 acts as a transportation container for one or more firmware packages during the download of the firmware packages to the non-operational storage area 101. Each firmware package from the firmware bundle may further contain multiple file types. As can be appreciated by those of ordinary skill within the art, the firmware bundle 105 may include other file types or packages, in addition to and/or in lieu of those depicted in this embodiment.

The firmware bundle 105 download may be initiated manually by the user or automatically by the device 100. The non-operational storage area 101 may utilize any input/output path 104 for the downloading of a firmware bundle 105. An input/output path 104 serves as a means for delivering data from one point to another. The input/output path 104 may include paths such as a universal serial bus, a serial port, an intelligent drive electronics channel, or a network path. As can be appreciated by those of ordinary skill within the art, the non-operational storage are may utilize other input/output paths 104, in addition to and/or in lieu of those depicted in FIG. 1

The non-operational storage area 101, illustrated in FIG. 1, is an area of physical memory which may be utilized to download and store various forms of data through an input/output path 104. The non-operational storage area 101 may store a downloaded firmware bundle 105 and an Early Boot Installer manager 102. The Early Boot Installer manager 102 may be an executable file that may spawn and receive status updates from one or more Early Boot installer processes. As can be appreciated by those of ordinary skill within the art, the non-operational storage area 101 may download and store other forms of data, in addition to those depicted in FIG. 1.

The non-operational storage area 101 may reside in a separate partition, of a present storage device, than each live copy of firmware on the device 100, on the same storage device, or on a separate storage device. In addition, the non-operational storage area 101 may be either physically attached to the device 100 or virtually networked to the device 100. The non-operational storage area 101 may be a hard drive, a compact disc, a flash disk, a network drive or any other form of computer readable medium. As can be appreciated by those of ordinary skill within the art, other forms of volatile and non-volatile media may be used as a non-operational storage area 101, in addition to and/or in lieu of those depicted in FIG. 1.

The non-operational storage area 101 may be written to, whether the non-operational storage area 101 is empty or if it is already populated with content. In one embodiment, if a firmware bundle 105 download is initiated to the non-operational storage area 101 and the non-operational storage area 101 is empty, the firmware bundle 105 will be downloaded and stored on the non-operational storage area 105. In another embodiment, if a new firmware bundle 105 download is initiated and there is already one or more firmware bundles stored on the non-operational storage area 101, the existing firmware bundle on the non-operational storage area 101 may either be fully overwritten each time a new firmware bundle is downloaded to the non-operational storage area 101, or the existing firmware bundle 105 may be retained along with the new firmware bundle download or the non-operational storage area 101. As can be appreciated by those of ordinary skill within the art, other methods of storing and overwriting data may be utilized when downloading a firmware bundle 105 to the non-operational storage area 101, in addition to and/or in lieu of those depicted in these embodiments.

A live copy of firmware 107 (e.g., live copy n 108) is the current firmware that a subsystem within the device 100 is running. Each subsystem within the device 100 possesses a live copy of firmware 107. In addition, the device 100 includes a version database 106. The version database 106 is a database within the device 100 which may store information about the device 101 or other components attached to the device 100.

The utilization of a non-operational storage area 101 adds protection to the device 100 if there is an interruption, such as a power outage, during the download of a firmware bundle 105 or during the installation of a firmware package. As illustrated in FIG. 1, in one embodiment, each live copy of firmware 107 and the version database 106 may remain untouched while the non-operational storage area 101 downloads a firmware bundle 105. In one embodiment, if the user of the device 100 initiates a firmware bundle 105 download through an input/output path 104, the download will write to the non-operational storage area 101 only. As a result, the danger that a live copy of firmware 107, such as live copy n 108, in the device 100 may get corrupted or partially overwritten is greatly reduced since each live copy of firmware 107 on the device 100 remains untouched until the firmware package has been fully downloaded to the non-operational storage area 101.

In addition, the concept of housing all executable file, in this case an Early Boot Installer manager 102, in the non-operational storage area 101 or outside the non-operational storage area 101 within a computer readable medium, allows the device 100 to be resilient against interruptions when the firmware packages from the non-operational storage area 101 are being installed over the live copies of firmware 107 on the corresponding subsystems within the device 100. In another embodiment, even if there is an interruption during an install and the corresponding live copy of firmware 107 on the subsystem is corrupted or incomplete, the device 100 may still launch the Early Boot Installer manager 102 and re-install again. As can be appreciate by those of ordinary skill within the art, the non-operational storage area 101 may offer other protections or performance advantages for the device 100, in addition to and/or in lieu of those depicted in FIG. 1.

Figure 2:
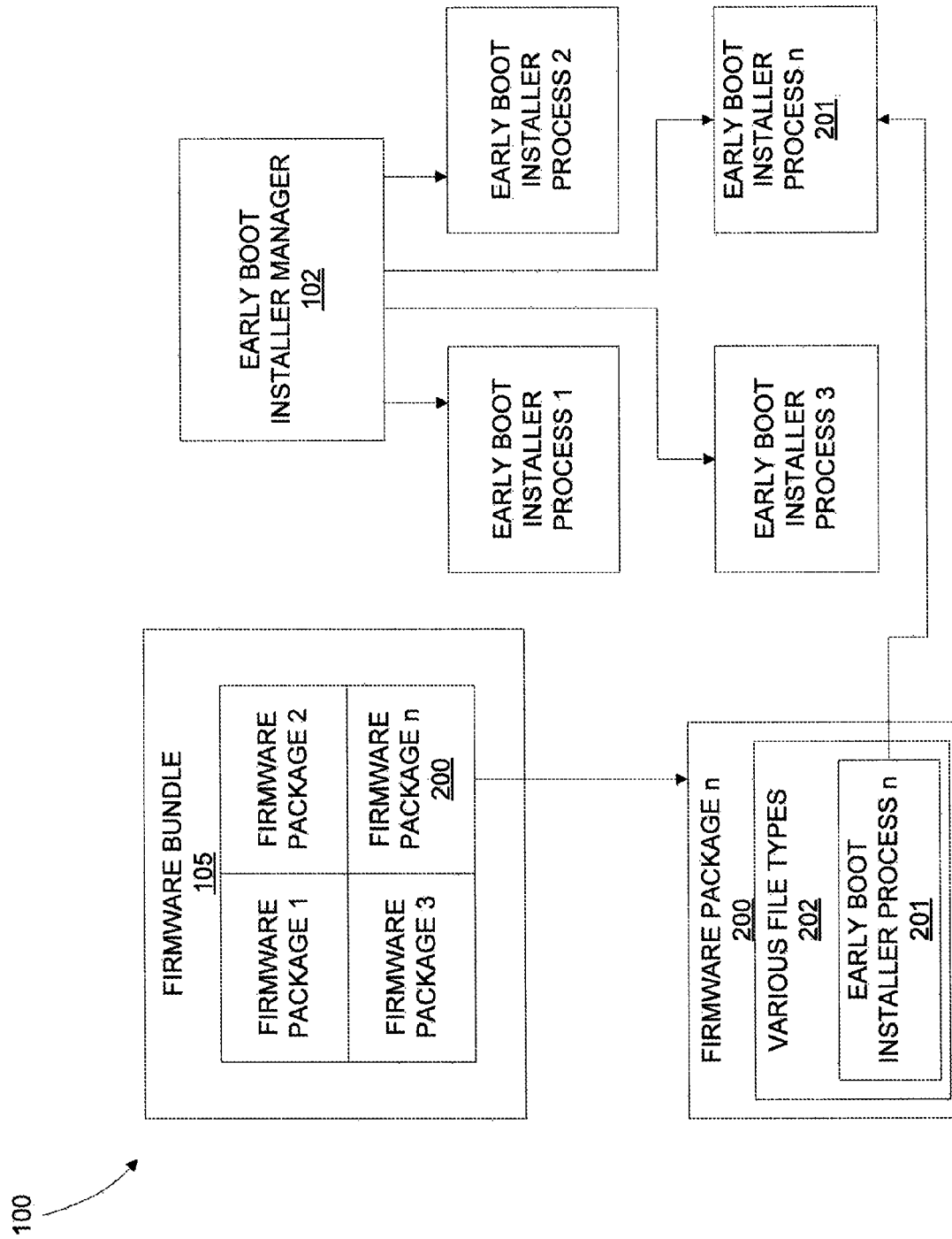
FIG. 2 illustrates a representation of potential usage of an Early Boot Installer manager, according to an embodiment of the invention.

After the firmware package has been downloaded to the non-operational storage area, tie device 100 may be rebooted and the Early Boot Installer manager may be launched. FIG. 2 illustrates a representation of a potential usage of the Early Boot Installer manager, according to an embodiment of the invention. In the example, firmware package n 200 from the downloaded firmware bundle 105 in the non-operational storage area 101 may contain Early Boot Installer process n 201. The Early Boot Installer manager 102 will spawn and monitor Early Boot Installer process n 201 and other Early Boot Installer processes from firmware package n 200 and other firmware packages from the firmware bundle 105.

In one embodiment, firmware package n 200 within the firmware bundle 105 may contain various file types 202. A firmware package is a container for one or more data files that may be utilized by the device 100 or a subsystem within the device 100. The various file types 202 may include image files, executable files, package files, or an Early Boot Installer process. As can be appreciated by those of ordinary skill within the art, each firmware package may include other file types, in addition to and/or in lieu of those depicted in the previous embodiment. The Early Boot Installer processes are spawned and managed by the Early Boot installer manager 102.

The Early Boot Installer manager 102 may be a configurable executable file which may be utilized to monitor and control data or processes. The Early Boot Installer manager 102 may be stored within the non-operational storage area 101 or within a computer readable medium outside the non-operational storage area 101, and may be launched after the device 100 has been rebooted. In one embodiment, the Early Boot Installer manager 102 may be launched after an operating system and one or more basic drivers is loaded. In addition, the Early Boot Installer manager 102 may be launched before a software component that may utilize one or more of the basic drivers are loaded. As can be appreciated by those of ordinary skill within the art, the Early Boot Installer manager 102 may launch at different times, in addition to and/or in lieu of those depicted in the previous embodiment.

After the Early Boot Installer manager 102 is launched, it may prohibit a normal boot process from continuing so that it may spawn one or more Early Boot Installer process and allow them to install to one or more subsystems within the device 100. In one embodiment, the Early Boot Installer manager 102 may send a halt command to the device 100. The halt command may prohibit the launching of any software component which may utilize one or more of the basic drivers that may already be loaded. As can be appreciated by those of ordinary skill within the art, the Early Boot Installer manager 102 may prohibit or allow other boot processes and other components from launching and loading in different fashions, in addition to and/or in lieu of those depicted in this embodiment.

In one embodiment, the software component is halted so that Early Boot Installer process n 201 can have full access to live copy n 108, which is being run by a corresponding subsystem within the device 100. By giving Early Boot Installer process n 201 or any other Early Boot Installer process access to a corresponding live copy of firmware in the device 100, the device 100 does not have to be continually rebooted to install to each subsystem of the device 100. As can be appreciate by those of ordinary skill within the art, components or processes may be halted for additional reasons, in addition to and/or in lieu of those depicted in this embodiment.

Each Early Boot Installer process is a configurable process that may be utilized by the device 100 to accomplish various tasks. The Early Boot Installer manager 102 spawns an Early Boot Installer process from each firmware package in the downloaded firmware package in parallel. In one embodiment, the Early Boot Installer manager 102 may relay an instruction to have firmware package n 200 launch Early Boot Installer process n 201, which resides in firmware package n 200. As can be appreciated by those of ordinary skill within the art, the Early Boot Installer manager may spawn other processes from the firmware package in the downloaded firmware bundle 105, in addition to and/or in lieu of those depicted in this embodiment.

The Early Boot Installer manager 102 may then keep track of each Early Boot Installer process and monitor the status of each Early Boot Installer process. The Early Boot Installer manager 102 monitors the status of each Early Boot Installer process by each Early Boot Installer process periodically sending status updates to the Early Boot Installer manager 102. In one embodiment, the information from the status updates may include whether Early Boot Installer process n 201 is still running, at what stage the Early Boot Installer process n 201 is currently at, and when Early Boot Installer process n 201 completes. In addition, the Early Boot Installer manager 102 may then send the information it receives from each Early Boot Installer process to the control panel 103, for user feedback. In one embodiment the Early Boot Installer manager 102 may send progress information concerning Early Boot Installer process n 201 to the control panel 103. As can be appreciated by those of ordinary skill within the art, the status provided may include other information or be sent to other devices or components, in addition to and/or in lieu of those depicted in the previous embodiment.

After each Early Boot Installer process has terminated, the Early Boot Installer manager 102 will allows a normal boot process to continue. In one embodiment, the device 100 may then continue to boot with each subsystem within the device 100 running with current firmware without any additional reboots. As can be appreciated by those of ordinary skill within the art, the Early Boot Installer manager 102 may prohibit or allow other boot processes from continuing and control the spawning of other processes, in addition to and/or in lieu of those depicted in these embodiment.

Figure 3:
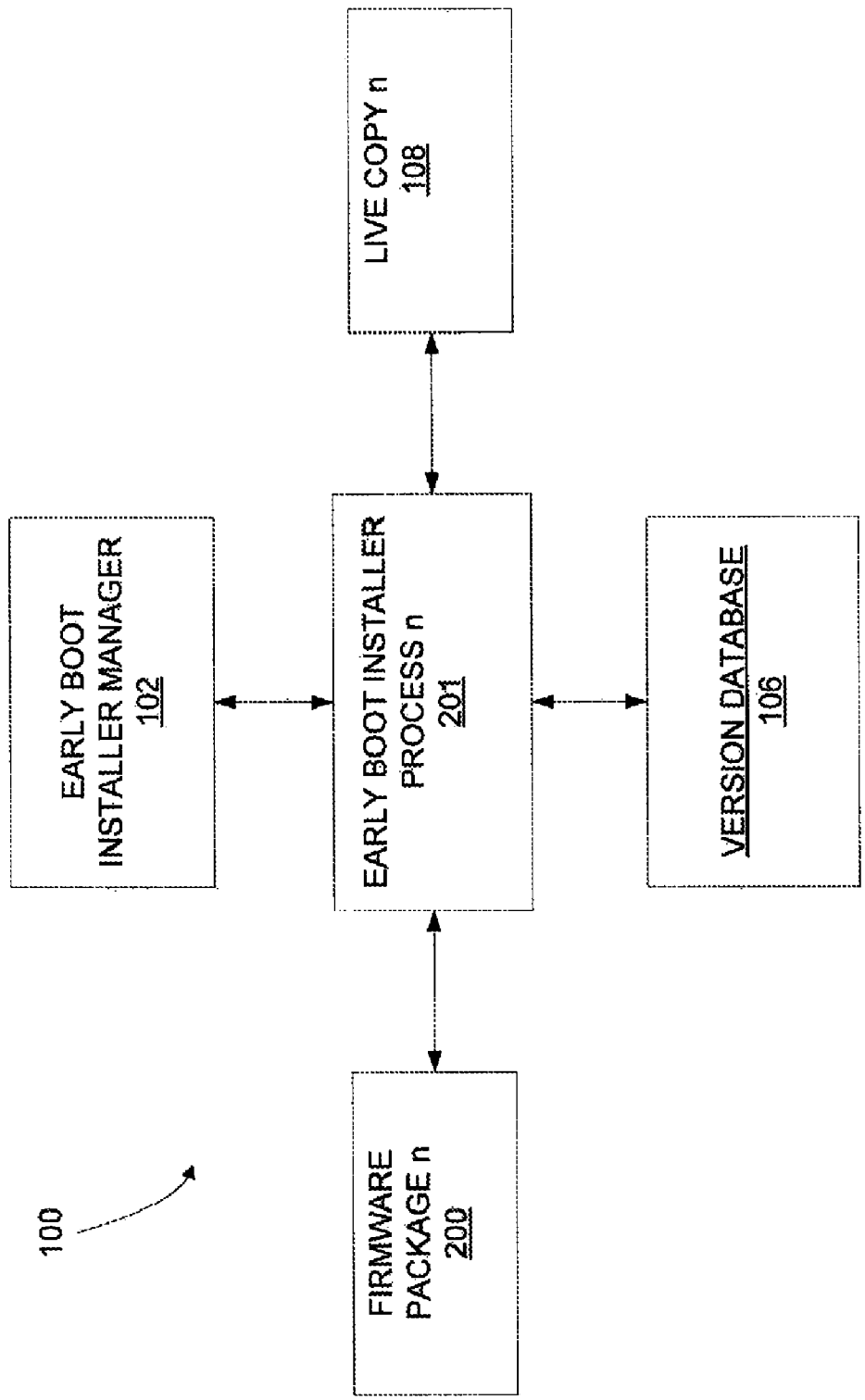
FIG. 3 illustrates a representation of potential usage of an Early Boot Installer process, according to an embodiment of the invention.

FIG. 3 illustrates a representation of potential usage of an Early Boot Installer process, according to an embodiment of the invention. The example includes Early Boot Installer process n 201, an Early Boot Installer manager 102, a corresponding firmware package n 200, a version database 106, and a corresponding live copy n 108 of firmware on the device 100.

As noted above, each Early Boot Installer process is spawned by the Early Boot Installer massager 102 from a firmware package within the downloaded firmware package in parallel. In one embodiment, each Early Boot Installer process that is spawned by the Early Boot Installer manager 102 will communicate with a version database 106 to determine in parallel whether an install to a corresponding subsystem within the device 100 is desired. If it is determined that an install is desired, the corresponding Early Boot Installer process will install over a corresponding subsystem's live copy of firmware in parallel with other Early Boot Installer processes that may be installing over other corresponding live copies of firmware.

Each Early Boot Installer processes will determine in parallel whether an install to a corresponding subsystem within the device 100 is desired. In one embodiment, Early Boot Installer process n 201 may read a value from an override flag, which is stored within the device 100, in parallel with other Early Boot Installer processes that may be reading a value from other corresponding override flags to determine in parallel whether an install to a corresponding subsystem within the device 100 is desired. An override flag value is a data value that can be recognized by the device 100 and may be utilized as an instruction to force an install or not to force an install. The override flag value may instruct corresponding early boot installer process n 201 whether or not to force an install on a corresponding subsystem of the device 100. Each override flag may be stored anywhere on the device 100. In the same embodiment, the override flag value may be expressed with a 1 to instruct corresponding Early Boot Installer process n 201 to force an install, or a 0 to instruct corresponding Early Boot Installer process n 201 not to force an install. If the value of the override flag is read to force an install, then an install to the corresponding subsystem will be desired and will always occur. As can be appreciated by one of ordinary skill within the art, the override value may be represented in different ways and may be utilized by other processes, components, or devices, in addition to and/or in lieu of those depicted in this embodiment.

In another embodiment, if the value of the override flag is not read to force an install, corresponding Early Boot Installer process n 201 may communicate with the version database 106 and corresponding firmware package n 200 on the non-operational storage area 101 in parallel with other Early Boot Installer processes that may be communicating with the version database 106 and other corresponding firmware packages on a non-operational storage area 101 to determine in parallel whether an install to a corresponding subsystem within the device 100 is desired. If the version database 106 has not yet been populated then a force install will always occur. Otherwise, Early Boot Installer process n 201 may check in parallel with other Early Boot Installer processes the corresponding live copy version, stored on a version list in the version database 106. If the version of corresponding firmware package n 200 is a more recent version than the corresponding live copy n 108 version, then Early Boot Installer process n 201 will determine that an install to live copy n 108 on the device 100 is desired. As can be appreciated by those of ordinary skill within the art, determining whether a firmware install is desired may comprise of other methods, in addition to and/or in lieu of those depicted in these embodiments.

Each Early Boot Installer process which determines that an install is desired may then install in parallel from a corresponding firmware package over the live copy of firmware on the corresponding subsystem when desired. As noted above, each firmware package resides in a firmware bundle and may contain various file types 202. In one embodiment, Early Boot Installer process n 201 may utilize the various file types 202 in corresponding firmware package n 200 to install over corresponding live copy n 108 in the device 100. As can be appreciated by those of ordinary skill within the art, each Early Boot Installer process may install to other components or devices and may utilize other methods to install in parallel, in addition to and/or in lieu of those depicted in this embodiment.

Each corresponding Early Boot Installer process will terminate when it completes an installation over a corresponding live copy of firmware on the corresponding subsystem. As noted above, once each Early Boot installer process completes, the Early Boot Installer manager 102 will allow the normal boot process to continue.

Figure 4:
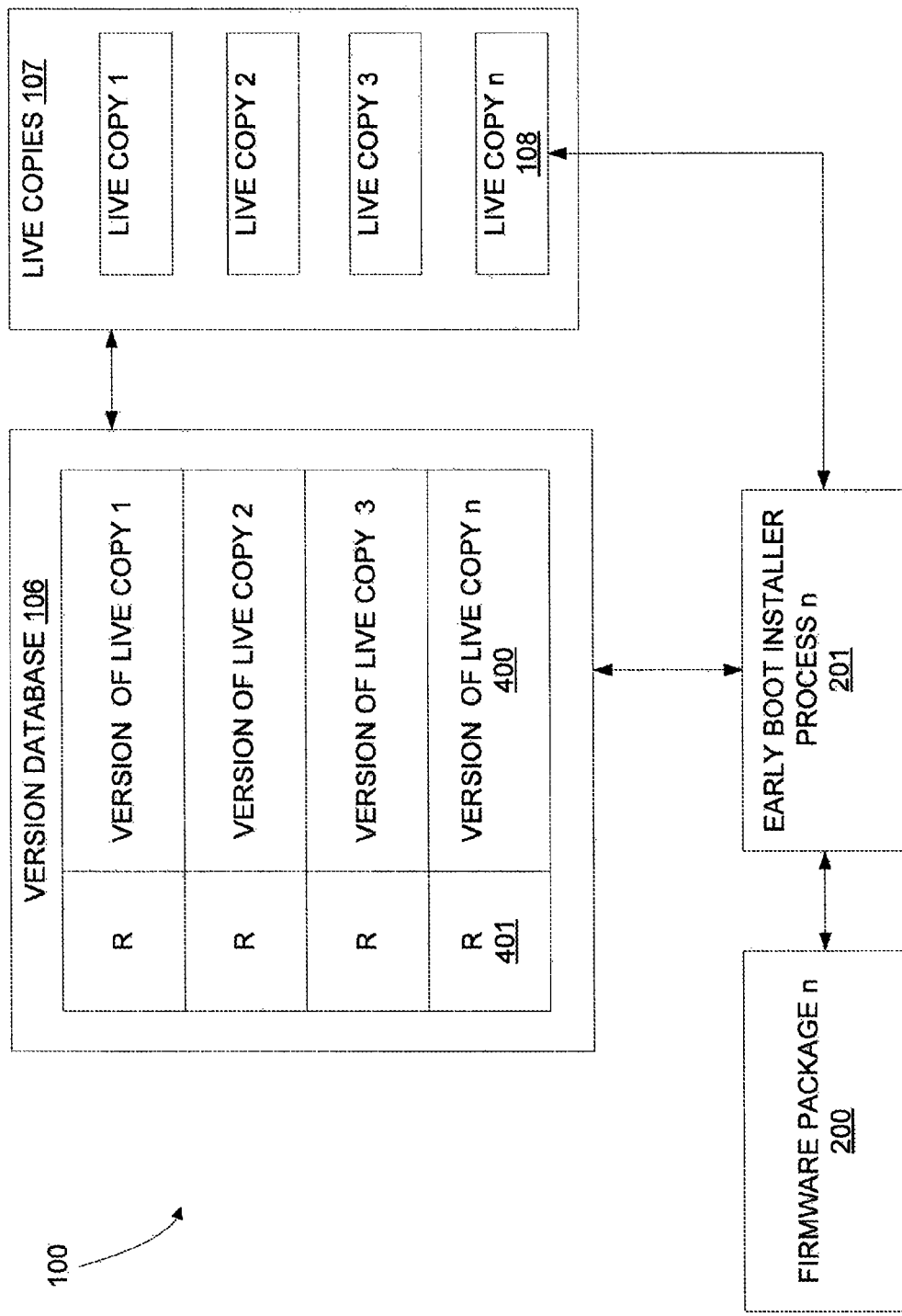
FIG. 4 illustrates a representation of potential usage of a version database, according to an embodiment of the invention.

FIG. 4 illustrates a representation of a usage of a version database 106, according to an embodiment of the invention. A version database 106 is a storage facility for various forms of data and information. In one embodiment, the version database 106 includes a list of resiliency flags and a list of firmware versions for each corresponding subsystem on the device 100. As can be appreciated by those of ordinary skill within the art, the version database 106 may include other lists or other information, in addition to and/or in lieu of those depicted in FIG. 4.

Each subsystem within the device 100 may have a corresponding resiliency flag which may be stored in a list, in the version database 106. A resiliency flag carries a value which reveals whether the most recent install to the device 100 was completed. A corresponding Early Boot Installer process may read the value of a corresponding resiliency flag and make a decision whether to re-install the corresponding firmware package, from the non-operational storage area, to the corresponding subsystem within the device 100. In one embodiment, resiliency flag 401 value may be expressed with a 1 to indicate that the most recent install was completed and a 0 to indicate that the most recent install was not completed. In the same embodiment, Early Boot Installer process n 201 may read resiliency flag 401 value to be a 0 and determine that corresponding firmware package, 200 from the non-operational storage area 101 should be reinstalled. As can be appreciated by those of ordinary skill within the art, the resiliency flag value may be represented by other numbers or values, in addition to and/or in lieu of those depicted in this embodiment.

In addition, the version database 106 may also store version information for each subsystem and each remote device that is attached to the device 100. The version information stored in the version list is the last known version of live copy the corresponding subsystem within the device 100 is running. In one embodiment, the version database 106 initially communicates with corresponding subsystem within the device 100 and obtains live copy n 108 version that the corresponding subsystem within the device 100 is running. The version database 106 then creates a version list of each version of live copy firmware being run within the device 100. As can be appreciated by those of ordinary skill within the art, the version information stored may include other versions, in addition to and/or in lieu of those depicted in this embodiment.

As noted above, each Early Boot Installer process may compare the version of the corresponding firmware package with the version of the corresponding live copy listed in the version database 106 when determining whether an install to the corresponding live copy firmware currently running on the corresponding subsystem in the device 100 is desired.

In one embodiment, version database 106 will be updated by Early Boot Installer process n 201. In updating the version database 106, the value of corresponding resiliency flag 401 will be configured so that it reflects that the most recent install was successful and corresponding version of live copy n 400 on the version list will be edited so that it reflects the current version of firmware live copy n 108 is running. Each Early Boot Installer process that completed an install will take similar actions in the updating of version database 106. As can be appreciated by those of ordinary skill within the art, updating version database 106 may include other methods or configurations, in addition to and/or in lieu of those depicted in this embodiment.

Figure 5:
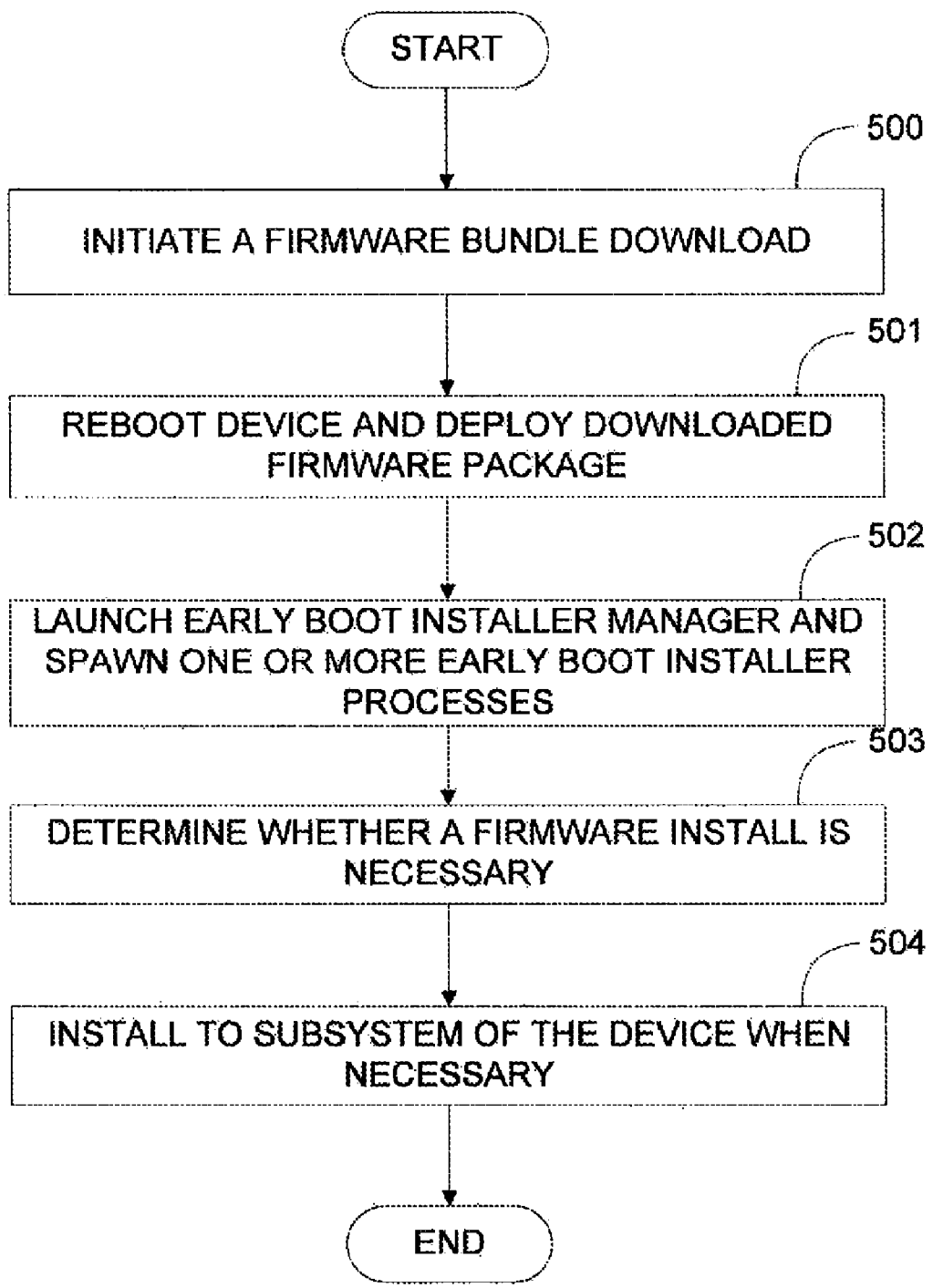
FIG. 5 is a flow diagram illustrating a method for downloading and installing a firmware package to one or more subsystem of a device in parallel, according to an embodiment of the invention.

FIG. 5 is a flow chart illustrating a method for downloading a firmware bundle and installing a firmware package to one or more subsystems of a device in parallel, according to an embodiment of the invention. The method may be performed by the device in one embodiment.

The first step 500 in the method embodiment shown in FIG. 5 is to initiate a firmware bundle download to a non-operational storage area. As has been noted, the firmware bundle may be downloaded through any input/output path.

The second step 501 in the method embodiment shown in FIG. 5 is to reboot the device to deploy the downloaded firmware package from the non-operational storage area to a subsystem of the device. As noted above the device may be rebooted after the firmware bundle has finished downloading to the non-operational storage area. In addition, the firmware bundle may include one or more firmware packages.

The third step 502 in the method embodiment shown in FIG; 5 is to launch an Early Boot installer manager to spawn and monitor the status of one or more Early Boot Installer processes. As noted above the Early Boot Installer manager may launch after an operating system and one or more basic driver has been loaded, but before a software component that may utilize one or more of the basic drivers is loaded.

The fourth step 503 in the method embodiment shown in FIG. 5 is to determine in parallel whether a firmware install to one or more subsystem of the device is desired. As noted above, a corresponding Early Boot: Installer process may read the value of corresponding resiliency flag and make a decision as whether to re-install the corresponding firmware package from the non-operational storage area if the previous install did not complete. Further, as noted above, each Early Boot Installer may read an override flag to determine whether to force an install. If the override flag value reflects to force an install, then it will always be determined that an install is desired. If the override flag value does not reflect a force install, then each Early Boot Installer process may compare the corresponding version of the firmware package with the corresponding subsystem version listed in a version database to determine whether or not a firmware install is desired.

The fifth step 504 in the method embodiment shown in FIG. 5 is to install in parallel to one or more subsystems of the device when desired. As noted above, each corresponding Early Boot Installer process may determine from an override flag, resiliency flag, or a version database 106 whether a firmware install is desired. If the corresponding Early Boot Installer process determines that a firmware install is desired, the corresponding Early Boot Installer may utilize various file types 202 from the corresponding firmware package, stored on the non-operational storage area 101, and overwrite the live copy of firmware the corresponding subsystem within the device 101 is running.

What is claimed is:

1. A method comprising:
   initiating a firmware bundle download to a non-operational storage area, such that a live copy of firmware in a device is not changed;
   rebooting the device to deploy one or more downloaded firmware packages from the non-operational storage area to the device;
   launching an Early Boot Installer manager to spawn and monitor the status of one or more Early Boot Installer processes contained in the firmware bundle download, wherein launching comprises initializing the Early Boot Installer manager after loading an operating system and one or more basic drivers and before launching a software component that utilizes one or more of the basic drivers;
   determining in parallel whether a firmware install to one or more subsystems of the device is desired; and
   installing the downloaded firmware package in parallel to one or more subsystems of the device when desired.

2. The method of claim 1, wherein initiating a firmware bundle download comprises fully overwriting the non-operational storage area with the firmware bundle or retaining multiple instances of the firmware bundle on the non-operational storage area for future installs.

3. The method of claim 1, further comprising prohibiting with the Early Boot Installer manager, the continuation of a normal boot process until each of the Early Boot Installer processes is complete.

4. The method of claim 1, wherein determining whether a firmware install is desired comprises:
   the Early Boot Installer process reading a value from an override flag, wherein the value from the override flag determines whether or not to force an install; and
   the Early Boot Installer process communicating with a version database and a corresponding firmware package on the non-operational storage area if the value from the override flag does not indicate a force install.

5. The method of claim 4, wherein communicating comprises:
   comparing a firmware package version with a corresponding live copy of firmware version, wherein the corresponding live copy of firmware version is listed in the version database.

6. The method of claim 1 further comprising updating a version database after a firmware package install has completed, wherein updating comprises the version database configuring the corresponding live copy of firmware version on the version database to have it reflect the current version the subsystem is running and configuring the corresponding resiliency flag on the version database to reflect that the most recent install to the corresponding subsystem was successful.

7. The method of claim 1, wherein the Early Boot Installer process may re-install over the corresponding subsystem firmware on the device depending on a corresponding resiliency flag value, wherein the resiliency flag is stored in the device.

8. The method of claim 1, wherein the Early Boot Installer process periodically provides a status report to the Early Boot Installer manager.

9. The method of claim 8, wherein the status report of the Early Boot Installer process is sent to a control panel by the Early Boot Installer manager.

10. An apparatus comprising:
   a device with one or more subsystems in parallel;
   a non-operational storage area, wherein the non-operational storage area may be configured to download a firmware bundle;
   a live copy of firmware, wherein the live copy of firmware resides in the device and remains untouched when a firmware bundle download occurs;
   an Early Boot Installer manager to spawn and monitor the status of one or more Early Boot Installer processes contained in the firmware bundle and to prohibit a normal boot process from continuing by sending a halt command to the device to prohibit the launching of a software component that utilizes a basic driver, wherein the Early Boot Installer manager is initialized after loading an operating system and the basic driver and before launching the software component that utilizes the basic driver; and
   a version database residing in the device.

11. The apparatus of claim 10, wherein the non-operational storage area may reside in a separate partition of a present storage device or on a separate storage device.

12. The apparatus of claim 10, wherein the device comprises:
   one or more operating systems;
   one or more basic drivers; and
   one or more software components.

13. The apparatus of claim 10, wherein the version database comprises:
   a list of each live copy of firmware version in the device; and
   a resiliency flag for each live copy of firmware in the device, wherein the resiliency flag shows whether the previous install to the corresponding live copy of firmware in the device completed.

14. The apparatus of claim 10, wherein the firmware bundle comprises one or more firmware packages.

15. The apparatus of claim 10, wherein the firmware package comprises one or more files and a plurality of file types.

16. The apparatus of claim 10, wherein the Early Boot Installer manager enables the device to boot if there is an interruption during a download of the firmware bundle to a non-operational storage area or if there is an interruption before each Early Boot Installer processes completes.

17. The apparatus of claim 10 wherein each Early Boot Installer processes resides in a corresponding firmware package.

18. The apparatus of claim 10 wherein the non-operational storage area may download the firmware bundle through an input/output path.

19. A non-transitory computer readable medium comprising:
   a non-operational storage area, wherein the non-operational storage area stores one or more firmware bundles;
   further wherein an Early Boot Installer manager reads a firmware packages from the non-operational storage area and spawns one or more Early Boot Installer processes in parallel, wherein the Early Boot Installer manager is configured to initialize after loading of an operating system and basic drivers in the device but before launching of a software component that utilizes a basic driver;
   further wherein the Early Boot Installer processes comprise means for determining in parallel whether a firmware install is desired for one or more corresponding subsystems of a device and means for installing in parallel to one or more corresponding subsystems of the device when desired.

* * * * *